Sept. 15, 1959 G. B. STILLWAGON, JR 2,903,868
UNIVERSAL JOINT AND METHOD OF MAKING SAME
Filed April 30, 1956 2 Sheets-Sheet 1

INVENTOR.
GEORGE B. STILLWAGON JR.
BY
Dybvig & Jacox
HIS ATTORNEYS

Sept. 15, 1959   G. B. STILLWAGON, JR   2,903,868
UNIVERSAL JOINT AND METHOD OF MAKING SAME
Filed April 30, 1956   2 Sheets-Sheet 2
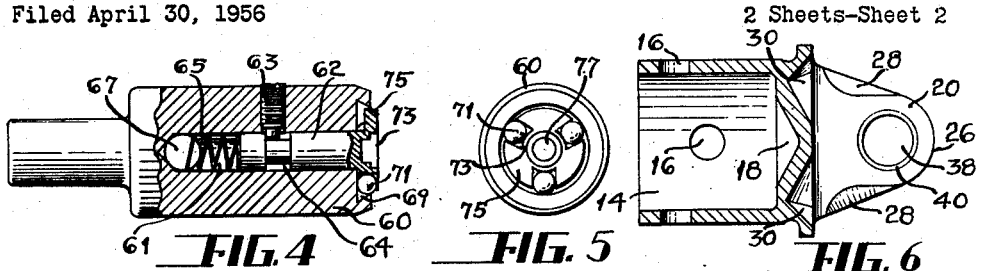
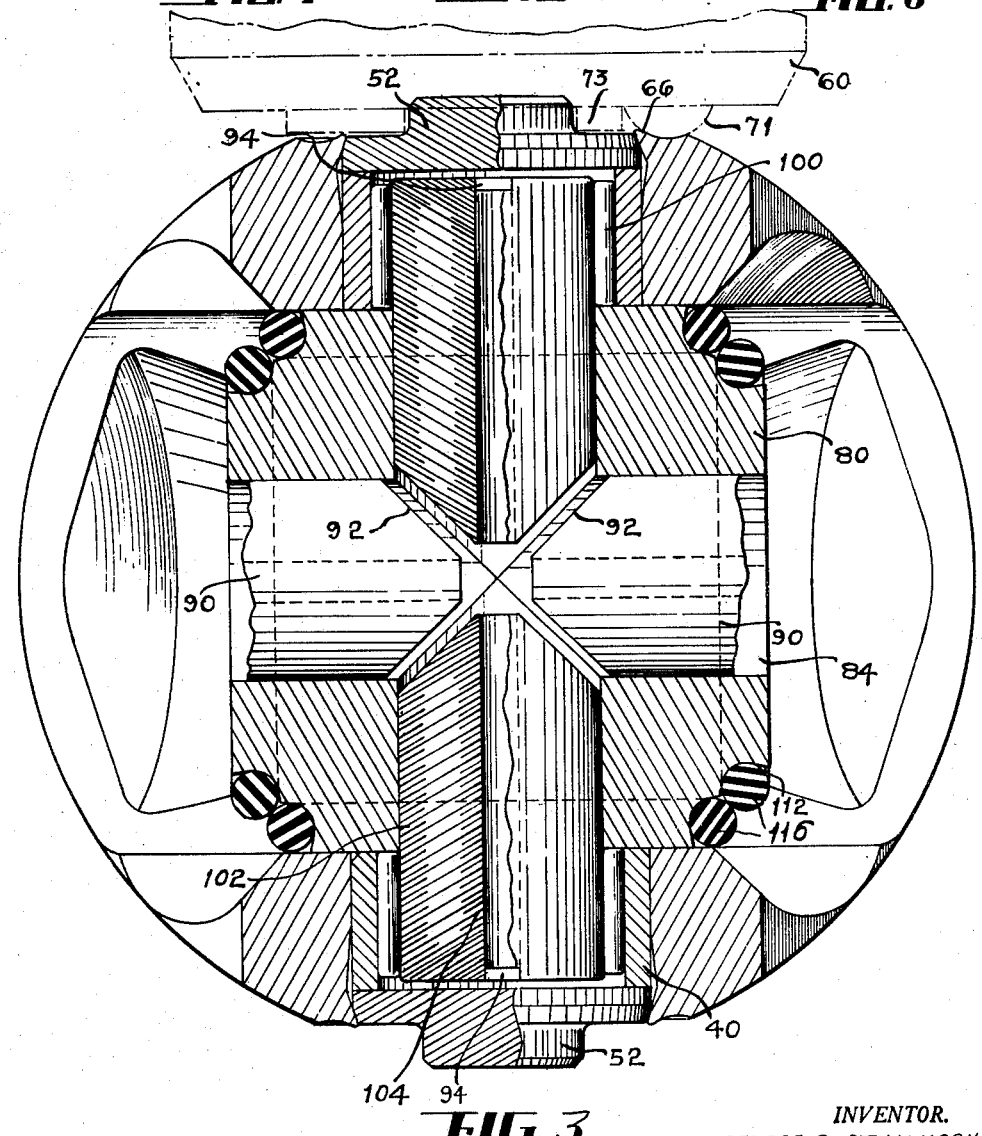
INVENTOR.
GEORGE B. STILLWAGON JR.
BY
HIS ATTORNEYS United States Patent Office 2,903,868
Patented Sept. 15, 1959

2,903,868
UNIVERSAL JOINT AND METHOD OF MAKING SAME

George B. Stillwagon, Jr., Dayton, Ohio, assignor of one-half to Kenneth G. Fraser, Dayton, Ohio Application April 30, 1956, Serial No. 581,523

16 Claims. (Cl. 64—17)

This invention relates to a universal joint for providing a flexible connection for two members which need not be axially aligned and to a method for constructing the universal joint.

An object of this invention is to provide a universal joint having high ultimate and yield strengths, extremely low back lash, and high running load capacity which is easy and economical to manufacture.

Another object of this invention is to provide a method for constructing the universal joint wherein extremely close tolerances may be met so as to provide for very low backlash.

Another object of this invention is to provide a universal joint ordinarily protected from the atmosphere having provision for lubrication as a means of expelling foreign matter, particularly wear and friction oxidation products. This foreign matter has a deleterious effect, shortening the life of the universal joint in the event it is not removed.

Still another object of this invention is to produce pins for a universal joint, which pins are case hardened to create internal stresses which are stronger than any external stresses which may be applied to the pins under normal usage.

A further object of this invention is to provide a tool for spinning the margins of apertures in the jaws of the universal joint against a capping member used in sealing the apertures.

Other objects and advantages reside in the construction of parts, the combination thereof and the mode of operation, as will become more apparent from the following description.

In the drawings, Figure 1 is a side elevational view of the universal joint incorporating the invention set forth herein.

Figure 3 is another enlarged cross sectional view taken substantially on the line 3—3 of Figure 1, with one set of jaws broken away for the purpose of illustration.

Figure 4 is a side elevational view, with parts shown in section, disclosing a tool for spinning the margins of the aperture surrounding the capping member.

Figure 5 is an elevational view, as viewed from the right of Figure 4.

Figure 6 is a cross sectional view of one of the connecting members.

Figure 1:
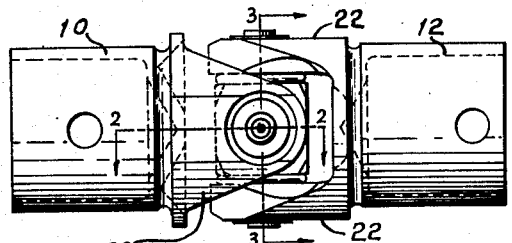

The universal joint of this invention is of the type wherein two connecting members, each provided with a pair of jaws, engage a coupling block. Pintles projecting normally from the faces of the coupling block are journalled into the jaws of the connecting members, the latter being thereby pivotally engaged to the block. In normal use, the forces exerted upon the pintles are directed normal to the axis of the pintles. When these forces are reversed, as frequently occurs in practice, the pintle is flexed slightly and repeated flexure causes fatigue failure of the pintle. This is a common failure in conventional universal joints which are subjected to conditions of extreme load reversals.

In the universal joint disclosed herein, the separation between the jaws of the coupling member and the surface of the coupling block is reduced to a minimum, allowing absolute minimum projection of the bearing surfaces of the pintles, with a consequent reduction in the bending load applied to the pintle.

The fatigue strength of the pintles is improved by case hardening. In the case hardening process, the carbon content of the surface of the pintles is increased from less than one percent to two or three percent, creating permanent longitudinal compression forces at the surface of the pintle, which forces resist bending. Although case hardening is common practice in the construction of universal joints, it is of particular importance in the present invention for the reason that the bending load upon the pintle has been reduced sufficiently that the order of magnitude of the internal stresses created by case hardening is commensurate with the order of magnitude of the bending load placed on the pintle. Thus, the effect of case hardening on fatigue strength is appreciable.

As a further means of improving the durability of the universal joint, the joint is so constructed that the forces exerted on the pintle are distributed along the length of the pintle rather than being directed at one end of the pintle. This feature will become more apparent from the description that follows.

Referring to the drawings, the reference numerals 10 and 12 indicate a pair of connecting members, each provided with a cylindrical recess 14, as best seen in Figure 6, adapted to be positioned on a shaft (not shown). The tubular members 10 and 12 are provided with transversely disposed apertures 16 that may be used in keying or securing the coupling members to the shaft. As may be clearly seen in Figure 6, the end wall of the cylindrical recess 14 is provided with a conical recess 18. This results from the tool used in forming the connecting members from suitable bar stock, as for example, a bar stock of steel.

By machining the connecting members 10 and 12 from bar stock that has been properly heat treated a minimum of internal stresses are developed after the part has been machined. The design is such that a much lower hardness can be used and at the same time develop high torsional strength. This allows heat treatment before machining, in that the hardness is sufficiently low to permit satisfactory machining. The machined part will hold its shape without any danger of warping caused by internal stresses induced in heat treatment. Instead of heat treating before machining, the method of manufacture is such that the parts may be heat treated after machining. When this is done, any distortion may be corrected by the aforementioned method of manufacture.

Each of the coupling members 10 and 12 is provided with a pair of jaws 20. These jaws are provided with facets 22, the outer ends 26 of the jaws being substantially circular.

An arcuate portion or depression 28 has been formed on the inner side of each of the jaws providing clearance for the movement of the jaws of the other coupling member.

The arcuate depressions 28 may be formed with a rotary cutting tool of substantially cylindrical shape having a diameter 1.25 to 2.5 times the distance between jaws. The annular margin of the tool where the end portion intersects the side thereof is rounded, the radius of curvature being 0.5 to 4 times the distance between jaws. Two depressions, one depression in each jaw of one connecting member, are cut simultaneously by directing the cutting tool parallel to the axis of rotation of the connecting member.

In order to provide clearance for the arcuate ends of the jaws, sectors 30 of a cylindrical recess are formed opposite the conical recess 18, thus permitting use of an extremely short jaw. The rotary tool used in making these recesses has a diameter greater than that of the circular end of the jaw, but less than the distance between the jaws, the diameter being 0.6 to 0.95 times the distance between jaws. In cutting the recess, the tool is inclined with respect to the normal to the axis of rotation of the coupling member at an angle of 0.75 to 1.25 times the maximum operating angle, that is the maximum angle one coupling member can deflect relative to the other coupling member in the assembled joint.

Each of the jaws is provided with an aperture 38 having press fitted therein a bushing 40. In order to obtain proper alignment, the inner surfaces of the bushings are finished after they have been press fitted into the jaws, opposite bushings being finished simultaneously. This eliminates any distortion created by press fitting, heat treating distortion or alignment errors. As may be clearly seen in Figure 2, the outer margin of the aperture 38 may be reamed slightly, thereby enlarging the outer portion of the aperture slightly, for reasons which will appear more fully later.

A coupling unit is employed to join the connecting members together. The coupling unit includes a center coupling block 80 that may originally consist of a cube that is machined. In order to remove surplus metal, the faces of this block 80 are provided with conical recesses 82 located opposite the connecting members 10 and 12. The block is also provided with a pair of transversely disposed holes 84 and 86. The hole 86 is positioned at right angles to the hole 84, the two holes intersecting in the center of the block. These holes may be finished so as to have a smooth inner surface that is perfectly cylindrical and of the proper diameter. Four tubular pintles 90, that may have their inner ends bevelled at 92, as best seen in Figure 3, are positioned in the holes 84. Each said pintle 90 is provided with a kerf or transverse groove 94 on the outer end thereof. A suitable tool engaging the kerf or groove 94 press fits the tubular pintles 90 into the block 80 the pintles being press fitted in place while the coupling block is disposed between the jaws of the coupling member. The kerf 94 is used to align the tubular pintles, so that the bevelled surfaces 92 face adjacent bevelled surfaces of adjacent tubular pintles. The tubular pintles 90 project outwardly from the block 80, each projecting into the bushings 40 of one of the several jaws 20. Suitable needle bearings 100 are positioned within the bushing 40 surrounding the outer end of the tubular pintle 90.

As indicated by the shading, the outer surface 102 and the inner surface 104 of each pintle have been case hardened.

Figure 2:
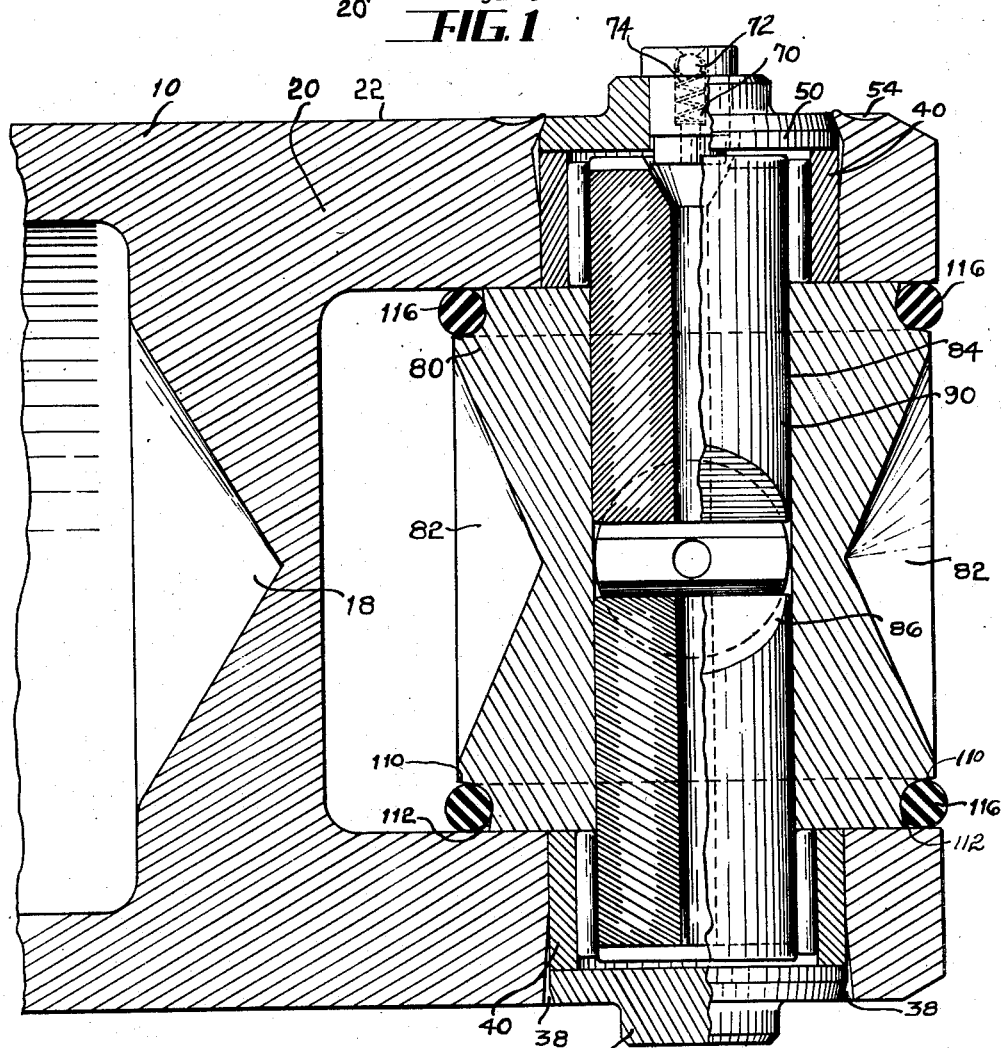
Figure 2 is a fragmentary, greatly enlarged cross sectional view of a portion of one of the connecting members and the coupling unit, taken substantially on the line 2—2 of Figure 1.

In order to distribute the forces exerted upon the bushings 40, the outer margins of the apertures in the jaws have been tapered or flared outwardly slightly, as shown in exaggerated proportions in Figure 2. In actual practice, the tapered portion may taper only .001 to .004 inch, the untapered portion extending about one half to one needle bearing diameter beyond half the length of the needle bearing. This taper permits the outer end of the bushing to flex slightly. Thus, the force directed upon the bushings 40 is distributed uniformly, or substantially so, throughout the entire length of the bushing. The same is true for the needle bearings 100. Without expanding the outer end of the aperture, the greatest stresses would be at the outer end of the bushing, thereby subjecting the bushings and needle bearings, and, for that matter, the projecting end of the tubular pintles to excessive stresses. The tendency of the surfaces of the brushing and pintle to Brinell is thereby reduced.

Capping members 50 and 52 are positioned in abutting arrangement with the outer margins of the bushings 40. These capping members are held in position by spinning the marginal portion of the apertures 38, forming an annular recess or groove 54 surrounding the capping members 50 and 52. A suitable tool, such as that shown in Figures 4 and 5, is used for the spinning operation.

The tool includes a supporting member 60 having a spindle 62 reciprocably mounted in a cavity 61. Reciprocal movement of the spindle 62 is limited by a pin 63 threadedly engaging the support member and cooperating with an annular channel 64 in the spindle. A coil spring 65 engaging a ball 67 seated in one end of the cylindrical cavity 61 urges the spindle axially. In one end of the support member 60 is a tapered cylindrical recess 69 adapted to receive three balls 71. An enlarged end portion 73 of the spindle provides a separator for the balls 71, and the tapered boundary of the recess 69 forms an outer race for the balls 71. Suitably shaped spacers 75 integral with the spindle 62 space the balls equally in the recess 69. A recess 77 in the enlarged end portion of the spindle 62 is provided for centering the tool.

The tool, mounted in a suitable chuck, is rotated and pressed against the capping member 50 or 52. A cylindrical projecting portion in the capping member seats in the recess 77 in the spindle 62 to center the tool. As the tool is pressed toward the cap, the spindle 62 retracts into the support member 60 allowing the balls 71 to contact the facets 22 of the jaws. Figure 3 shows the tool in phantom engaging one jaw of a connecting member. The rotation of the balls 71 under pressure forms the annular groove 54, creating a lip 66 which overlaps the beveled or tapered margin of the capping member 50 or 52, as the case may be, tightly sealing the aperture in the jaw so as to retain the bushing, pintle, and needle bearings in place. The method of forming the groove 54 so as to seal the capping members 50 or 52 results in a very rigid, strong and dependable lock for the capping members.

The capping member 50 is provided with an axially disposed aperture 70 normally closed by a valve including a ball valve 72 biased outwardly by a compression spring 74. This aperture permits lubricant to be forced in through the capping member.

When using the universal joint, it is not only desirable, but absolutely necessary, to introduce a lubricant as a means of expelling wear and friction oxidation products from the interstices between moving parts. In order to provide for the expulsion of used lubricant, the center block 80 is provided with annular shoulders concentric with the holes 84. As may readily be seen by referring to Figures 2 and 3, the wall 110 of the shoulder flares outwardly away from the inner surface of the adjacent jaws and the wall 112 flares inwardly. O-rings 116 engaging the inner surfaces of the jaws are seated in these shoulders. When a lubricant is forced in through the ball valve 72 in the capping member 50, the lubricant being supplied under pressure, it can readily be seen that the interior of the holes through the centers of the tubular pintles 90 are supplied with lubricant which flows transversely in the kerf 94 at the ends of each pintle to lubricate the needle bearings and the bushings. The lubricant also extends between the jaws and the adjacent faces of the block 80.

After all cavities have been filled with lubricant, if additional lubricant is supplied, the O-rings 116 will expand, in that these are made from an elastomer, such as neoprene. This provides a relief valve mechanism for the lubricant. As the O-rings 116 are forced outwardly, it can readily be seen that the outwardly inclined wall 110 permits the O-ring to move away from the adjacent surface of the jaw, thereby permitting lubricant to escape. This feature is utilized to replace used lubricant and to expel any foreign matter that may have accumulated in the used lubricant. It is important that all the seals permit lubricant to escape, so that the lubricant fills the entire cavity. The seal disclosed herein accomplishes this result. By filling all of the cavities, there are no voids for entrance of air and moisture, even under severe changes of atmospheric pressures. This minimizes the deleterious effect of oxidation of the surfaces of the metallic parts.

As the universal joint is used, the ends of the jaws of one connecting member may move into the cylindrical segmental recess 30 of the other member so as to permit greater deflection of the connecting members than would be possible without such a recess. Furthermore, the depressions or cut-away portions 28 in the margins of the jaws of each connecting member provide a clearance for the margins of the jaws of the other connecting member. These recesses and depressions allow maximum operating angles of the coupling members and yet allow maximum strength and rigidity.

Although the preferred embodiment of the device has been described, it will be understood that within the purview of this invention various changes may be made in the form, details, proportion and arangement of parts, the combination thereof and mode of operation, which generally stated consist in a device capable of carrying out the objects set forth, as disclosed and defined in the appended claims.

Having thus described my invention, I claim:

1. In a universal joint having a pair of connecting members each terminating in a pair of jaws, each said jaw having a tapered aperture therein, a plurality of bushings, there being one bushing disposed within each tapered aperture, a plurality of caps, there being one cap in abutment with each bushing for closing the outer end of each said aperture, means for securing said caps to said jaws, a coupling unit including a coupling block having a plurality of pintles projecting normal to the faces thereof, there being one pintle for each said jaw, the pintles projecting into the bushings disposed within the jaws, and a plurality of needle bearings encircling each said pintle within each said bushing, the connecting members being thereby pivotally secured to the coupling block.

2. A universal joint according to claim 1, wherein the means for securing the caps to the jaws of the connecting members includes an annular lip spun into each jaw adjacent the aperture therein for engaging the cap.

3. In a universal joint having a pair of connecting members each terminating in a pair of jaws, each said jaw having a tapered aperture therein, a plurality of bushings, there being one bushing disposed within each said tapered aperture, a coupling unit including a coupling block having a plurality of case hardened pintles projecting normal to the faces thereof, there being one pintle for each said jaw, the pintles projecting into the bushings disposed within the jaws, and a plurality of needle bearings encircling each said pintle within each said bushing, the connecting members being thereby pivotally secured to the coupling block.

4. A universal joint including a pair of connecting members, each terminating in a pair of apertured jaws, the margins of each jaw having an arcuate cut-away portion cooperating with a like cut-away portion of the adjacent jaw to provide clearance, a centrally disposed coupling block, and pintles projecting outwardly from the coupling block seated in the apertures in the jaws, each said connecting member having a pair of recesses intermediate the jaws thereof, each said recess being one segment of a cylindrical recess providing clearance for the ends of the jaws of the opposite connecting member.

5. A universal joint according to claim 4, wherein the arcuate cut-away portions in the jaws of each connecting member each lie on a surface of revolution generated by a rotary cutting tool having a diameter 1.25 to 2.5 times the distance between the jaws of one connecting member and having a rounded end portion of radius 0.4 to 1.6 times the diameter of the main body thereof, said tool being directed parallel to the rotational axis of said connecting member so as to simultaneously cut one arcuate portion in each jaw of the connecting member.

6. A universal joint according to claim 4, wherein the recesses intermediate the jaws of each connecting member each lie on a surface of revolution generated by a rotary cutting tool having a diameter 0.6 to 0.95 times the distance between the jaws of one connecting member, said tool being directed at an angle with respect to the rotational axis of the connecting member of 0.75 to 1.25 times the maximum angle of deflection of one connecting member relative to the other connecting member.

7. A universal joint according to claim 4, wherein the recesses intermediate the jaws of each connecting member are segments of a cylindrical cavity having a diameter .6 to .95 times the distance between the jaws of one connecting member.

8. A universal joint according to claim 4, wherein the opposite arcuate cut-away portions in the jaws of each connecting member lie in a toroidal surface generated by a straight line portion terminating in a rounded end portion having a radius of curvature 0.5 to 4 times the distance between jaws.

9. The method of making a universal joint comprising the steps of fabricating a pair of connecting members, each including a cylindrical portion terminating in a pair of parallel apertured jaws, press fitting a bushing in the aperture of each said jaw, finishing simultaneously the inner surfaces of the bushings in the parallel jaws of each connecting member so as to properly align the apertures in the bushings, placing a coupling block having two transversely arranged holes intersecting in the center thereof between the jaws of the connecting members so that one of the transversely arranged holes is aligned with the bushings of one connecting member and the other hole is aligned with the bushings of the other connecting member, press fitting a pintle into the coupling block through the bushing in each said jaw, the pintles meeting at the center of the coupling block, inserting a plurality of needle bearings in each said bushing, the needle bearings surrounding each said pintle, and securing a capping member in the aperture in each said jaw in abutment with each said bushing.

10. The method of making a universal joint comprising the steps of fabricating a pair of connecting members, each including a cylindrical portion terminating in a pair of parallel apertured jaws, press fitting a bushing in the aperture of each said jaw, finishing simultaneously the inner surfaces of the bushings in the parallel jaws of each connecting member so as to properly align the apertures in the bushings, placing a coupling block having two transversely arranged holes intersecting in the center thereof between the jaws of the connecting members so that one of the transversely arranged holes is aligned with the bushings of one connecting member and the other hole is aligned with the bushings of the other connecting member, press fitting a pintle into the coupling block through the bushing in each said jaw, the pintles meeting at the center of the coupling block, inserting a plurality of needle bearings in each said bushing, the needle bearings surrounding each said pintle, placing a capping member in the aperture in each said jaw in abutment with each said bushing, and spinning an annular groove in each said jaw to create an annular lip encircling each said capping member to thereby secure the capping members to the jaws.

11. A universal joint comprising a pair of connecting members, each terminating in a spaced pair of apertured jaws, a rectangular coupling block, opposite ends of said block projecting between the jaws of said connecting members, the inner faces of said jaws engaging opposite faces of said coupling block, a plurality of pintles projecting from said coupling block, there being one pintle journalled in the aperture of each said jaw whereby said connecting members are secured pivotally to said coupling block, a plurality of capping members, there being one secured to each said jaw in covering relation to the aperture therein, said block having annular shoulders in faces thereof, there being one annular shoulder opposite each said jaw spaced from and encircling the pintle projecting into the aperture of that jaw, the faces of said coupling block outside said annular shoulders flaring away from said jaws, and a plurality of O-rings, there being one O-ring seated against each said shoulder, the flared faces of the coupling block permitting said O-rings to move away from the inner faces of said jaws upon expansion of said O-rings away from said shoulders.

12. A universal joint comprising a pair of connecting members, each terminating in a spaced pair of apertured jaws, a rectangular coupling block, opposite ends of said coupling block projecting between the jaws of said connecting members, the inner surfaces of said jaws engaging the faces of said coupling block, a plurality of pintles projecting from said coupling block, there being one pintle journalled in the aperture of each said jaw, a plurality of capping members, there being one capping member secured to each said jaw in covering relation to the aperture therein, means for introducing a lubricant to the apertures of said jaws, said coupling block having annular shoulders in faces thereof, there being one annular shoulder opposite each said jaw spaced from and encircling the pintle projecting into the aperture of that jaw, the faces of said coupling block outside said annular shoulders flaring away from said jaws, a plurality of O-rings, there being one O-ring seated on each said shoulder in normally contacting relation to the inner surface of the adjacent jaw, the flared faces of said coupling block permitting said O-rings to move away from the inner surfaces of said jaws upon said O-rings being expanded as by the force of lubricant expelled from the apertures in said jaws into the interstices between the jaws and the faces of the coupling block.

13. A universal joint comprising a pair of connecting members, each terminating in a spaced pair of apertured jaws, a rectangular coupling block, opposite ends of said block projecting between the jaws of said connecting members, the inner faces of said jaws engaging opposite faces of said coupling block, a plurality of pintles projecting from said coupling block, there being one pintle journalled in the aperture of each said jaw whereby said connecting members are secured pivotally to said coupling block, a plurality of capping members, there being one secured to each said jaw in covering relation to the aperture therein, means providing annular shoulders spaced from and encircling said pintles between the opposing faces of said jaws and said coupling block, one of said opposing faces having a portion flared away from the other face outside each said annular shoulder, and a plurality of O-rings, there being one O-ring seated against each said shoulder in contacting relation to said opposing faces, the flared portions of said faces permitting said O-rings to move out of contact therewith upon expansion of said O-rings away from said shoulders.

14. A universal joint comprising a pair of connecting members each terminating in a pair of jaws, each said jaw having an aperture therein, a plurality of bushings, there being one bushing disposed within each said aperture, cylindrical caps disposed in the apertures of said jaws in abutment with said bushings for closing the outer ends of said apertures, the outer ends of said caps having beveled margins, annular lips spun into said jaws adjacent the apertures therein for engaging the beveled margins of said caps, and a coupling block having a plurality fo pintles projecting normal to the faces thereof, there being one pintle for each said jaw, the pintles projecting into the bushings disposed within the jaws, whereby said connecting members are pivotally secured to said coupling block.

15. A universal joint including a pair of connecting members, each terminating in a pair of apertured jaws, the margins of each jaw having an arcuate cut-away portion cooperating with a like cut-away portion of the adjacent jaw to provide clearance, a centrally disposed coupling block, and pintles projecting outwardly from the coupling block seated in the apertures in said jaws, each said connecting member having a pair of recesses intermediate the jaws thereof providing clearance for the ends of the jaws of the opposite connecting member.

16. The method of making a universal joint comprising the steps of fabricating a pair of connecting members each including a cylindrical portion terminating in a pair of parallel apertured jaws, fitting a bushing in the aperture of each said jaw, finishing apertures in the bushings while the bushings are fitted in the jaws of the connecting members so as to align the apertures in the bushings of each connecting member, placing a coupling block having two transversely arranged holes between the jaws of the connecting members so that one of the transversely arranged holes is aligned with the bushings of one connecting member and the other hole is aligned with the bushings of the other connecting member, press fitting pintles into the coupling block through the bushings in said jaws, inserting a plurality of needle bearings in each said bushing, the needle bearings surrounding each said pintle, and securing a capping member in the aperture in each said jaw in abutment with each said bushing.

References Cited in the file of this patent

UNITED STATES PATENTS

| | | |
|---|---|---|
| 681,960 | Flanigan | Sept. 3, 1901 |
| 1,673,399 | Cutting | June 12, 1928 |
| 1,700,991 | Wintercorn | Feb. 5, 1929 |
| 1,987,415 | Padgett | Jan. 8, 1935 |
| 2,078,739 | Slaght | Apr. 27, 1937 |
| 2,141,264 | Cutting | Dec. 27, 1938 |
| 2,173,759 | McCloskey | Sept. 19, 1939 |
| 2,794,693 | Burkhalter | June 4, 1957 |